US010035070B2

(12) United States Patent
Perez et al.

(10) Patent No.: US 10,035,070 B2
(45) Date of Patent: Jul. 31, 2018

(54) COMPUTER GAME ELEMENTS, SYSTEMS, AND METHODS THEREFOR

(71) Applicant: KING.COM LIMITED, St. Julians (MT)

(72) Inventors: Julian Perez, St. Julians (MT); Sebastian Knutsson, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 14/174,493

(22) Filed: Feb. 6, 2014

(65) Prior Publication Data
US 2014/0221088 A1  Aug. 7, 2014

Related U.S. Application Data

(60) Provisional application No. 61/811,019, filed on Apr. 11, 2013.

(30) Foreign Application Priority Data

Feb. 6, 2013  (GB) .................................. 1302121.7
Feb. 19, 2013 (GB) .................................. 1302910.3
(Continued)

(51) Int. Cl.
A63F 13/00       (2014.01)
A63F 13/837      (2014.01)
(Continued)

(52) U.S. Cl.
CPC ............ *A63F 13/837* (2014.09); *A63F 13/52* (2014.09); *G07F 17/32* (2013.01); *A63F 9/02* (2013.01);
(Continued)

(58) Field of Classification Search
CPC ............ A63F 2300/6653; A63F 13/837; A63F 2300/8076; A63F 13/00; A63F 9/02; A63F 17/006
See application file for complete search history.

(56) References Cited

U.S. PATENT DOCUMENTS 5,704,837 A * 1/1998 Iwasaki ................... A63F 13/00
                                                   463/2
6,093,104 A * 7/2000 Kasahara .............. A63F 13/005
                                                   463/10
(Continued)

FOREIGN PATENT DOCUMENTS

WO  WO 2010/096784 A1   8/2010
WO  WO 2011/011466 A1   1/2011
WO  WO 2011/139716     11/2011

OTHER PUBLICATIONS

Richard's Game Reviews—Bubble Shooter, Mar. 19, 2011.*
(Continued)

*Primary Examiner* — James S McClellan
*Assistant Examiner* — Syvila Weatherford
(74) *Attorney, Agent, or Firm* — Saul Ewing Arnstein & Lehr LLP

(57) ABSTRACT

In an embodiment there is provided a game element within a game adapted to be played on data processing apparatus, the method comprising the following steps implemented by at least one processor of the data processing apparatus, displaying a game area having a plurality of game objects on the display, providing a predetermined player object configured for targeting and shooting of the game objects in response to player input, providing predetermined data comprising characteristics of at least one game element, selecting the at least one game element and associated characteristics for display, displaying the at least one game element, and executing the characteristics of said at least one (Continued)

game element in the game in dependence on a trigger event. A computing system, user device and server are also described.

5 Claims, 11 Drawing Sheets

(30) Foreign Application Priority Data

| Mar. 13, 2013 | (GB) | 1304545.5 |
|---|---|---|
| Jun. 13, 2013 | (GB) | 1310589.5 |
| Aug. 7, 2013 | (GB) | 1314147.8 |
| Sep. 9, 2013 | (GB) | 1316045.2 |

(51) Int. Cl.
| *G07F 17/32* | (2006.01) |
|---|---|
| *A63F 13/52* | (2014.01) |
| *A63H 17/00* | (2006.01) |
| *A63H 13/10* | (2006.01) |
| *A63F 9/02* | (2006.01) |
| *A63F 13/44* | (2014.01) |

(52) U.S. Cl.
CPC ....... *A63F 13/44* (2014.09); *A63F 2300/6653* (2013.01); *A63H 13/10* (2013.01); *A63H 17/006* (2013.01)

(56) References Cited

U.S. PATENT DOCUMENTS

| 8,021,220 | B2* | 9/2011 | Sakamoto | A63F 13/10 273/317.1 |
|---|---|---|---|---|
| 8,075,391 | B2* | 12/2011 | Rommerdahl | G07F 17/32 463/16 |
| 8,221,238 | B1 | 7/2012 | Shaw et al. | |
| 8,790,168 | B1 | 7/2014 | Wolters et al. | |
| 2003/0119581 | A1* | 6/2003 | Cannon | G07F 17/32 463/25 |
| 2005/0054446 | A1 | 3/2005 | Kammler et al. | |
| 2006/0121990 | A1 | 6/2006 | O'Kelley et al. | |
| 2006/0135264 | A1 | 6/2006 | Shaw et al. | |
| 2008/0153570 | A1* | 6/2008 | Esses | G07F 17/3295 463/20 |
| 2009/0075738 | A1 | 3/2009 | Pearce et al. | |
| 2009/0275412 | A1 | 11/2009 | Green et al. | |
| 2010/0125632 | A1 | 5/2010 | Leonard et al. | |
| 2010/0216553 | A1 | 8/2010 | Chudley et al. | |
| 2010/0227675 | A1 | 9/2010 | Luxton et al. | |
| 2011/0218045 | A1 | 9/2011 | Williams et al. | |
| 2011/0312409 | A1 | 12/2011 | Vancura et al. | |
| 2012/0077580 | A1 | 3/2012 | Mahajan et al. | |
| 2012/0184362 | A1 | 7/2012 | Barclay et al. | |
| 2012/0184823 | A1 | 7/2012 | Chen et al. | |
| 2012/0191606 | A1 | 7/2012 | Milne et al. | |
| 2013/0316836 | A1 | 11/2013 | Vogel et al. | |
| 2014/0115144 | A1 | 4/2014 | Guest et al. | |

OTHER PUBLICATIONS

JustOnlineGames—Bubble Pandy © 2011.*
Bubble Witch Saga Review by A. Webster, Sep. 22, 2011.*
Bursting Balls added Mar. 15, 2010.*
Anonymous: "Why King.com's Candy Crush is crushing it on Facebook," XP055085338, retrieved from the Internet: URL: http://blog.games.com/2012/05/01/why-king-coms-candy-crush-is-crushing-it-on-facebook/ [retrieved on Oct. 25, 2013, pp. 1-4 (May 1, 2012).
Anonymous: "Facebook Spiel Candy Crush Saga: Cheats, Tipps, News und Videos BILDspielt," XP055085339, retrieved from the Internet: URL: http://www.bildspielt.de/social-games/3-gewinnt/candy-crush-saga-180643/ [retrieved on Oct. 25, 2013], pp. 1-10 (Apr. 12, 2012).
Collins: "Will Collins Game Spotlight: Candy Crush Saga," XP055085345, retrieved from the Internet: URL:https//developers.facebook.com/blog/post/2012/06/15/game-spotlight-candy-crush-saga/ [retrieved on Oct. 25, 2013], pp. 1-2 (Jun. 15, 2012).
King.com Skill Games for iPhone and Facebook: http://www.ubergizmo.com/2009/07/king-com-skill-games-for-iphone-and-facebook/ (Apr. 5, 2012).
Anonymous: "Daily Bonus Level Oct. 17, 2012 Bubble Witch Saga Fan Site," XP055109244, retrieved from the Internet: URL:http://bubble-witch-saga.se/daily-bonus-level-17-oct-2012/ [retrieved on Mar. 21, 2014] pp. 1-2 (Jul. 31, 2012).
Anonymous: "Bubble Witch Saga—Gamespot," XP055109245, retrieved from the Internet: URL:http://www.gamespot.com/bubble-witch-saga/ [retrieved on Mar. 21, 2014] pp. 1-2 (Jul. 31, 2012).
Anonymous: "King.com expands to Google+ with Bubble Witch Saga," XP055109246, retrieved from the Internet: URL:http://www.insidesocialgames.com/2012/01/24/king-com-expands-tog-goe-withbubble-witch-saga/ [retrieved on Mar. 21, 2014], pp. 1-12 (Jan. 24, 2012).
Anonymous: "Facebook Platform—Wikipedia, the free encyclopedia," XP055109249, retrieved from the Internet: URL: http://en.wikipedia.org/w/index.php?title=Facebook_Platform&oldid=533105335 [retrieved on Mar. 21, 2014] pp. 1-4 (Jan. 14, 2013).
International Search Report, dated Mar. 31, 2014, and Written Opinion, issued in corresponding International Application No. PCT/EP2014/000321.

* cited by examiner

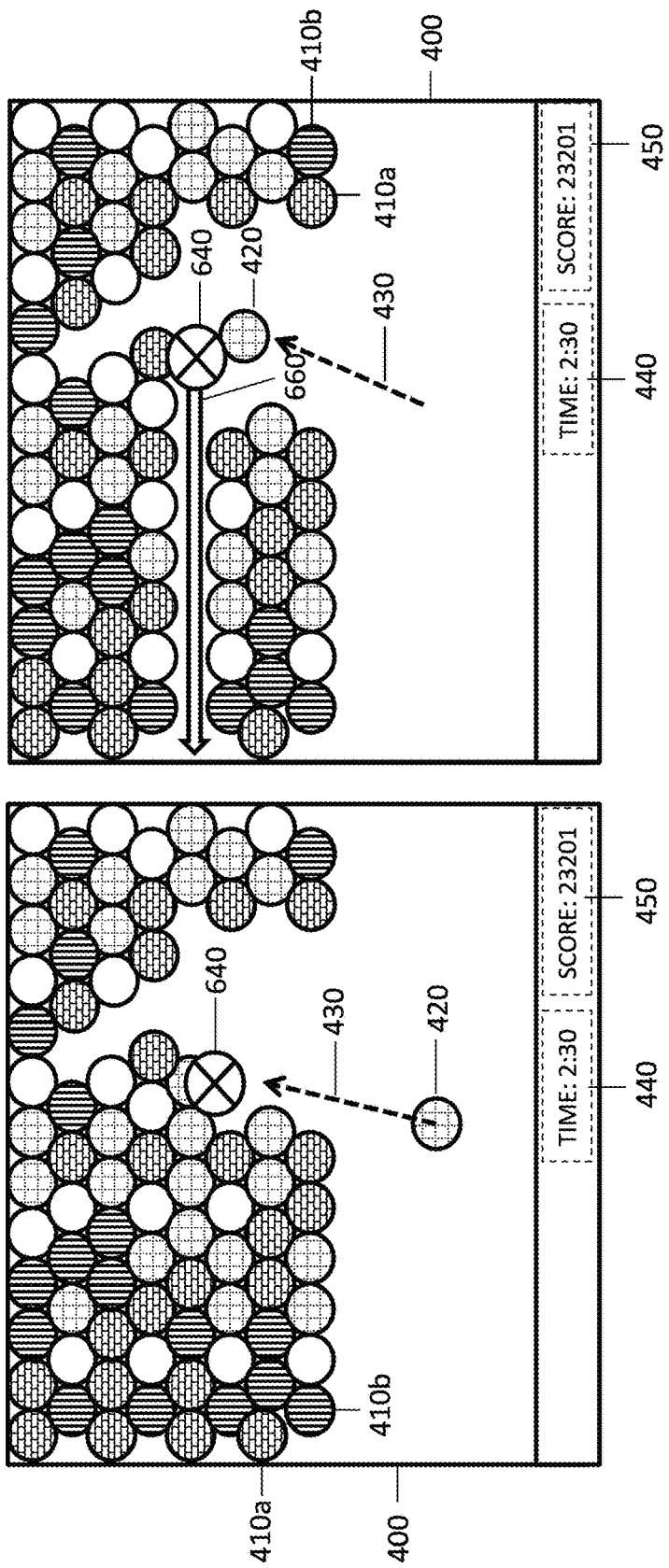

Figure 11

| GE | C | TE |
|---|---|---|
| 1 (460) | O,optM | H |
| 2 (540) | A | F |
| 3 (640) | LB (H,D) | H |
| 4 | U (PS) | H,A |

910 — GE
920 — C
930 — TE
900

COMPUTER GAME ELEMENTS, SYSTEMS, AND METHODS THEREFOR

CROSS-REFERENCE TO RELATED APPLICATIONS

This application is based on and claims priority to GB Application No. 1302121.7, filed Feb. 6, 2013; GB Application No. 1302910.3, filed Feb. 19, 2013; GB Application No. 1304545.5, filed Mar. 13, 2013; U.S. Provisional Application No. 61/811,019, filed Apr. 11, 2013; GB Application No. 1310589.5, filed Jun. 13, 2013; GB Application No. 1314147.8, filed Aug. 7, 2013; and GB Application No. 1316045.2, filed Sep. 9, 2013, the entire contents of each of which being fully incorporated herein by reference.

FIELD OF EMBODIMENTS

Some embodiments may relate to game elements in a computer game. Some embodiments may relate to game elements in a computer game in an online environment.

Some embodiments may relate to controlling a user interface responsive to user engagement with displayed elements on the interface of a computer device.

BACKGROUND

In the field of computer-implemented games, there are many technical challenges facing the designer of such games when considering how the user interface is to be controlled in the context of computer devices available to play the game.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

There are therefore many technical challenges when designing computer implemented games, particularly in providing a challenge to a player that is engaging and rewarding so as to provoke repeat play. This particularly may, but not exclusively, apply to "casual games".

SUMMARY

According to an aspect, there is provided a computer implemented method of controlling a user interface responsive to user engagement with a displayed game area on the interface, the method comprising the following implemented by a processor of a computer device: displaying a game area having a plurality of game objects on said display, providing a player object configured for targeting and shooting of said game objects in response to player input, providing data comprising characteristics of at least one game element, selecting at least one game element and associated characteristics for display, displaying said at least one game element, and executing said characteristics of said at least one game element in said game wherein said executed characteristics of a respective game element comprises one of: said game element obscuring at least one of said game objects displayed in said game; said game element absorbing at least one game or player objects; said game element eliminating a plurality of game objects; and said game element resetting said displayed game area and said game objects to a previous state The characteristics of said game element may comprise that the displayed game element is stationary with respect to said objects.

The characteristics of said at least one game element may comprise that the displayed at least one game element is moving with respect to said objects.

In response to said player input, said player object may be controlled to shoot said game element to cause a game object previously obscured by said game element to be displayed.

The plurality of game objects to be eliminated may be arranged in a horizontal or diagonal direction with respect to said at least one game element and said game area.

The previous state may comprise the game state immediately prior to a triggering event.

The previous state may comprise a game state prior to the shooting of the previous player object.

The game element may comprise a booster.

The game element absorbing game or player objects may be removed after said game absorbing game element has absorbed a predetermined number of game or player objects.

The game may be a bubble shooting game.

The selecting may comprise generation determined by an algorithm.

The executing said characteristics of said at least one game element in said game may be in dependence on a trigger event The trigger event may comprises the detection of coincidence of said player object with said at least one game element in response to input.

The trigger event may comprise the selection of a booster.

According to another aspect, there is provided a computer device having: a user interface configured to display a game area having a plurality of game objects and to display at least one game element, said user interface being configured to receive user input; and at least one processor in conjunction with at least one memory configured to: provide a player object configured for targeting and shooting of said game objects in response to player input, provide data comprising characteristics of at least one game element, select said at least one game element and associated characteristics for display by said user interface, and executing said characteristics of said at least one game element in said game, wherein said executed characteristics of a respective game element comprises one of: said game element obscuring at least one of said game objects displayed in said game; said game element absorbing at least one game or player objects; said game element eliminating a plurality of game objects; and said game element resetting said displayed game area and said game objects to a previous state The characteristics of said game element may comprise that the displayed game element is stationary with respect to said objects.

The characteristics of said at least one game element may comprise that the displayed at least one game element is moving with respect to said objects.

In response to said player input, said processor may be configured such that said player object shoots said game element to cause a game object previously obscured by said game element to be displayed by said user interface The plurality of game objects to be eliminated may be arranged in a horizontal or diagonal direction with respect to said at least one game element and said game area.

The previous state may comprise the game state immediately prior to a triggering event.

The previous state may comprise a game state prior to the shooting of the previous player object.

The game element may comprise a booster.

The game element absorbing game or player objects is removed after said game absorbing game element has absorbed a predetermined number of game or player objects.

The game may be a bubble shooting game.

The processor may be configured to use an algorithm to control said selecting.

The executing of said characteristics of said at least one game element in said game may be in dependence on a trigger event The trigger event may comprise the detection of coincidence of said player object with said at least one game element in response to input by said player According to an aspect, there is provided a method for providing a game element within a game adapted to be played on data processing apparatus having a display, the method comprising the following steps implemented by at least one processor of said data processing apparatus comprising: displaying a game area having a plurality of game objects on said display, providing a predetermined player object configured for targeting and shooting of said game objects in response to player input, providing predetermined data comprising characteristics of at least one game element, selecting said at least one game element and associated characteristics for display, displaying said at least one game element, and executing said characteristics of said at least one game element in said game in dependence on a trigger event.

The characteristics of said at least one game element of the method may comprise the at least one game element obscuring at least one of said game object(s) displayed in said game.

The characteristics of the at least one game element of the method may comprise that the displayed game element is stationary with respect to said objects.

The characteristics of the at least one game element of the method may comprise that the displayed game element is moving with respect to said objects.

The characteristics of the at least one game element of the method may comprise absorbing game or player objects.

The characteristics of the at least one game element of the method may comprise resetting said displayed game area and said game objects to a previous state, and wherein said previous state may comprise the game state immediately prior to said triggering event.

The characteristics of the at least one game element of the method may comprise eliminating a plurality of game objects upon said triggering event, and may further comprise wherein said plurality of game objects to be eliminated are arranged in a horizontal or diagonal direction with respect to said game element.

The selecting may comprise generation determined by an algorithm.

The algorithm may determine said generation based on game data.

The algorithm may comprise monitoring a time interval since last generation.

The monitoring may be further modified in dependence on game data.

The game data may comprise a game score, or turns or shots taken.

The trigger event of said method may comprise the detection of coincidence of said player object with said at least one game element in response to input.

The characteristics of said game element may comprise the removal of said at least one game element from display in response to said trigger event.

The predetermined data may comprise characteristics of a game element provided in a table.

The table may comprise characteristics and trigger events associated with said game element.

According to another aspect, there is provided a system for executing a computer game program, said system comprising a display, at least one memory storing predetermined data comprising characteristics of at least one game element, an input device for receiving player input, and at least one processor configured to: select said game element and associated characteristics for display on said display, display said game element on said display, and execute said characteristics of said game element in said game in dependence on a trigger event.

The at least one processor may be configured to select said game element by executing a generation algorithm provided in said memory.

The generation algorithm provided in said memory may comprise the monitoring by said at least one processor of a time interval since last generation, and the monitoring may further be modified in dependence on game data.

The game data may comprise a game score, or turns or shots taken.

The at least one processor of said system may be configured to detect said trigger event.

Said trigger event detection may comprise detecting coincidence of said player object with said game element on said display in response to input.

The at least one processor of said system may be configured to, in dependence on said game element characteristics, remove from said display said game element display in response to said trigger event.

The at least one memory may store said characteristics of said game element in a table, and said table may comprise at least one of characteristic data and trigger event data.

The system may comprise a server configured to communicate with said at least one processor through a network.

The server may comprise at least one memory storing predetermined data comprising characteristics of at least one game element.

The server may be further configured to provide communication through said network to a social network.

According to yet another aspect, there is provided a user device for executing a computer game program, said device comprising a display, at least one memory storing provided predetermined data comprising characteristics of at least one game element, an input device for receiving player input, and at least one processor configured to select said game element and associated characteristics for display on said display, display said game element on said display, and execute said characteristics of said game element in said game in dependence on a trigger event.

The at least one processor of said user device may be configured to select said game element by executing a generation algorithm provided in said memory.

The generation algorithm may comprise the monitoring by said at least one processor of a time interval since last generation.

The monitoring may be further modified in dependence on game data.

The game data may comprise a game score, or turns or shots taken.

The user device may comprise said processor being configured to detect said trigger event.

Said trigger event detection may comprise detecting coincidence of said player object with said game element on said display in response to input.

The at least one processor of said user device may be configured to, in dependence on said game element characteristics, remove from said display said game element display in response to said trigger event.

The at least one memory of said user device may store said characteristics of said game element in a table.

The table may comprise at least one of characteristic data and trigger event data.

According to another aspect, there is provided a computer program comprising program code instructions that, when executed by a processor, causes said processor to perform the following steps: displaying a game area having a plurality of game objects, providing a predetermined player object configured for targeting and shooting of said game objects in response to player input, providing predetermined data comprising characteristics of a game element, selecting said game element and associated characteristics for display, displaying said game element, and executing said characteristics of said game element in said game in dependence on a trigger event.

According to yet another aspect, there may be provided a computer readable storage device storing instructions that, when executed by a processor, causes said processor to perform the following steps: displaying a game area having a plurality of game objects, providing a predetermined player object configured for targeting and shooting of said game objects in response to player input, providing predetermined data comprising characteristics of a game element, selecting said game element and associated characteristics for display, displaying said game element, and executing said characteristics of said game element in said game in dependence on a trigger event.

BRIEF DESCRIPTION OF DRAWINGS

To understand some embodiments, reference will now be made by way of example only to the accompanying drawings, in which:

FIG. 7*a* illustrates a game area with a game element before detection of a trigger event according to some embodiments;

FIG. 7*b* illustrates a game area with a game element after detection of a trigger event according to some embodiments;

FIG. 11 is an example of stored data of an embodiment.

DETAILED DESCRIPTION OF SOME EMBODIMENTS

Figure 1:
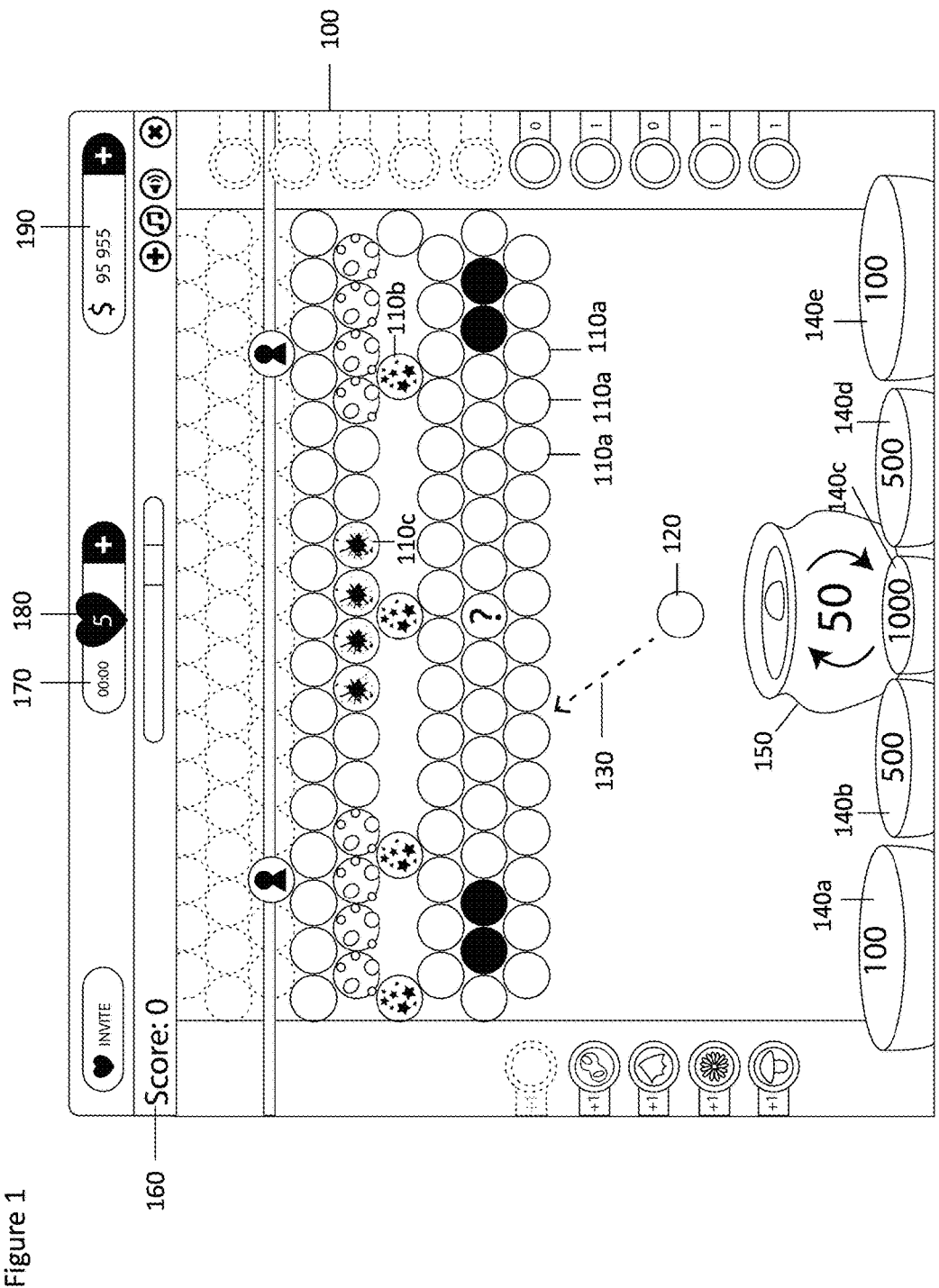
FIG. 1 shows an example embodiment of a game area.

The techniques described herein can be implemented in for instance a video game such as a 'bubble shooter' game. The game mixes up the bubble popping with explosive bombs and other special bubbles to clear your way to the top faster. The player can in some embodiments connect the bombs that are mixed into the bubbles on the game board to create long blast chains and then detonate to uncover game elements that can award the player points.

In a typical bubble shooter game the player operates a player element launcher that can shoot player elements in to the game board. The game board is typically populated with a number of game elements already. The game elements are of different types. The number of different types of game elements may vary between the levels.

The launched player element will travel toward the game elements already on the game board and stick to the elements on the game board. In one embodiment, if the launched player element hit a game element of the same type that already have another game element of the same type adjacent to it the three game elements will disappear from the game board. This can for instance be done through a popping animation.

If the launched player element will cause two other game elements to pop that will leave one game element on the game board with no adjacent game element or a set of game elements that will not have a connection sequence of adjacent game elements to the top of the game board then the orphaned game element or elements will fall downwards on the game board.

The falling game elements can in some embodiments land in receptacles in the lower end of the game board and in some embodiments bounce off game objects that are placed on the game board.

The game elements that are launched in to the game board can be random or based on a set pattern. The player can in some embodiments replace the game element to be launched with another game element, for instance the next game element in the 'launch queue'.

The player elements that are in the launch queue may be of the same type as the game elements that are already on the game board, but the skilled person will understand that the game can be implemented in several ways.

The game element launcher can have a sight line extending in to the game board to aid the player in how the launched game element will travel in to the game board.

The game can be implemented with the game element launcher in the lower edge of the game board. The launcher can in some embodiment move right and left along the edge of the game board.

There can in some embodiments of the game be one or more special game elements. An embodiment may have one or more of these special game elements that when activated will destroy a number of other game elements on the game board irrespective of which type they are. Such game elements will be described in more detail later.

The game board can have some bomb game elements already mixed into it at the start of a level or a game.

Using the bomb game elements may help the player to complete the level fast.

The game can be implemented so that a level or a game session is completed when all game elements on the game board have been cleared. The player can have a limited time or a limited number of game elements to launch in to the game board or a combination of both.

The player can in some embodiments be awarded for good gameplay. For instance after a series of consecutive launched game elements that have caused game elements to disappear from the game board. In one embodiment the player is awarded a special game element that can be launched from the game element launcher or a booster. The number of special game elements can be displayed for instance in relation to the game element launcher.

The game can in one embodiment end if the player runs out of time or shots before he manages to blast the final row of bombs at the top of the level.

The game board has a number of game elements of different types aligned in rows. The game elements on the game board can have 6 (or any other suitable number) of contact points with other game elements. There can be empty spaces on the game board where there are not game elements. There can also be other game objects on the game board that are not game elements and in some embodiments that cannot be removed.

Game elements can be removed from the game board in three main ways

Pop the game element through combining it with two other game elements of the same type.

Clear game elements above it so that it has no connections to game elements that are connected to the top of the game board. This will cause the game element to fall downwards on the game board and be removed from the game board.

Blast the game element with an explosion from a bomb game element.

There can in some implementations be special game elements that change the gameplay for the player. There can for instance be 'black game elements' that cannot be matched with other game elements. These game elements can only be removed from the game board with a blast or that they are dropped down from the game board.

Other special game elements will be described below.

Reference is made to FIG. 1 which shows an example embodiment of a "bubble shooter" type computer game such as "Bubble Witch Saga"™. The game has a game area 100 upon which are disposed game objects 110a, 110b, and 110c. The objects may be of different colours or types. There is also provided a player object 120 which may be a projectile for shooting at the game objects depending on the game. A target indicator 130 is provided which may be moved by the player to target game objects 110a, 110b. 110c with player object or projectile 120. FIG. 1 also shows scoring pots 140a, 140b, 140c, 140f, 140e. A pot 150 for providing player objects is also shown. Typically the game area 100 will also depict game indicators such as a score 160, a time played 170, lives and/or turns left 180, and may indicate an in game currency 190.

In such games, the object may be to clear the game area 100 of game objects 110a, 110b, and 110c by shooting the player object 120 at the game objects. If the properties of the game object 110a and the player object 120 match (such as color or any other suitable criteria) then the game object 110a is eliminated. In some embodiments, there may be a requirement for the player object to match two or more adjacent game objects for the game objects to be eliminated.

Figure 2:
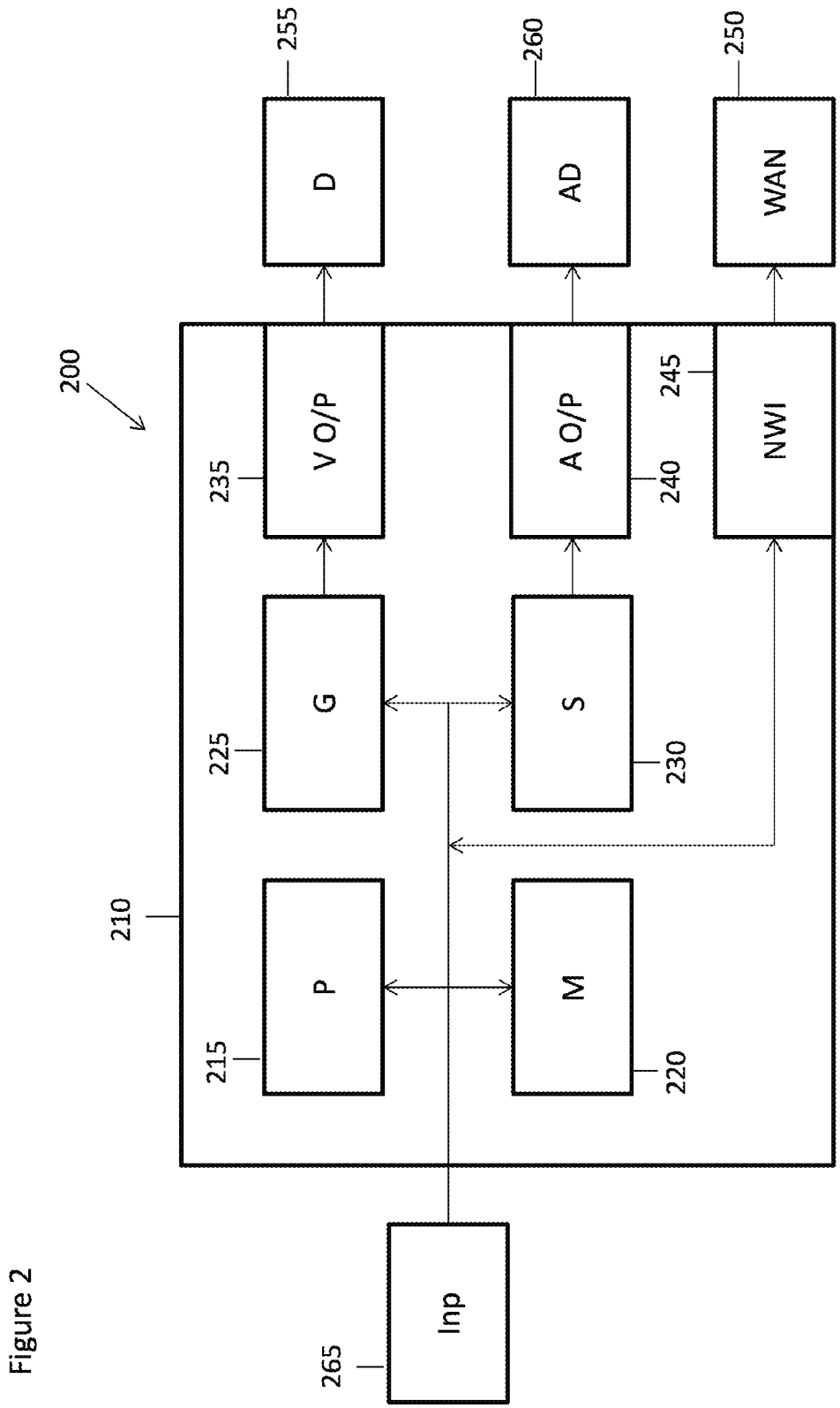
FIG. 2 shows an example user device in which some embodiments may be provided.

A schematic view of a user device 200 according to an embodiment is shown in FIG. 2. All of the blocks shown are implemented by suitable circuitry. The blocks may be implemented in hardware and/or software. The user device may have a control part 210. The control part 210 has one or more processors 215 and one or more memories 220. The control part 210 is also shown as having a graphics controller 225 and a sound controller 230. It should be appreciated that one or other or both of the graphics controller 225 and sound controller 230 may be provided by the one or more processors 215.

The graphics controller 225 is configured to provide a video output 235. The sound controller 230 is configured to provide an audio output 240. The controller 210 has an interface 245 allowing the device to be able to communicate with a network 250 such as the Internet or other communication infrastructure.

The video output 235 is provided to a display 255. The audio output 240 is provided to an audio device 260 such as a speaker and/or earphone(s).

The device 200 has an input device 265. The input device 265 can take any suitable format and can be one or more of a keyboard, mouse, touch screen, joystick or game controller. It should be appreciated that the display 255 may in some embodiments also provide the input device 265 by way of an integrated touch screen for example.

The blocks of the controller 210 are configured to communicate with each other by an interconnect such as a bus or any other suitable interconnect and/or by point to point communication.

It should be appreciated that in some embodiments, the controller 210 may be implemented by one or more integrated circuits, at least in part.

The user device 200 is shown by way of example only. In alternative embodiments, one or more of the parts may be omitted. Alternatively or additionally, some embodiments may comprise one or more other parts. Alternatively or additionally, one or more parts may be combined.

Figure 3:
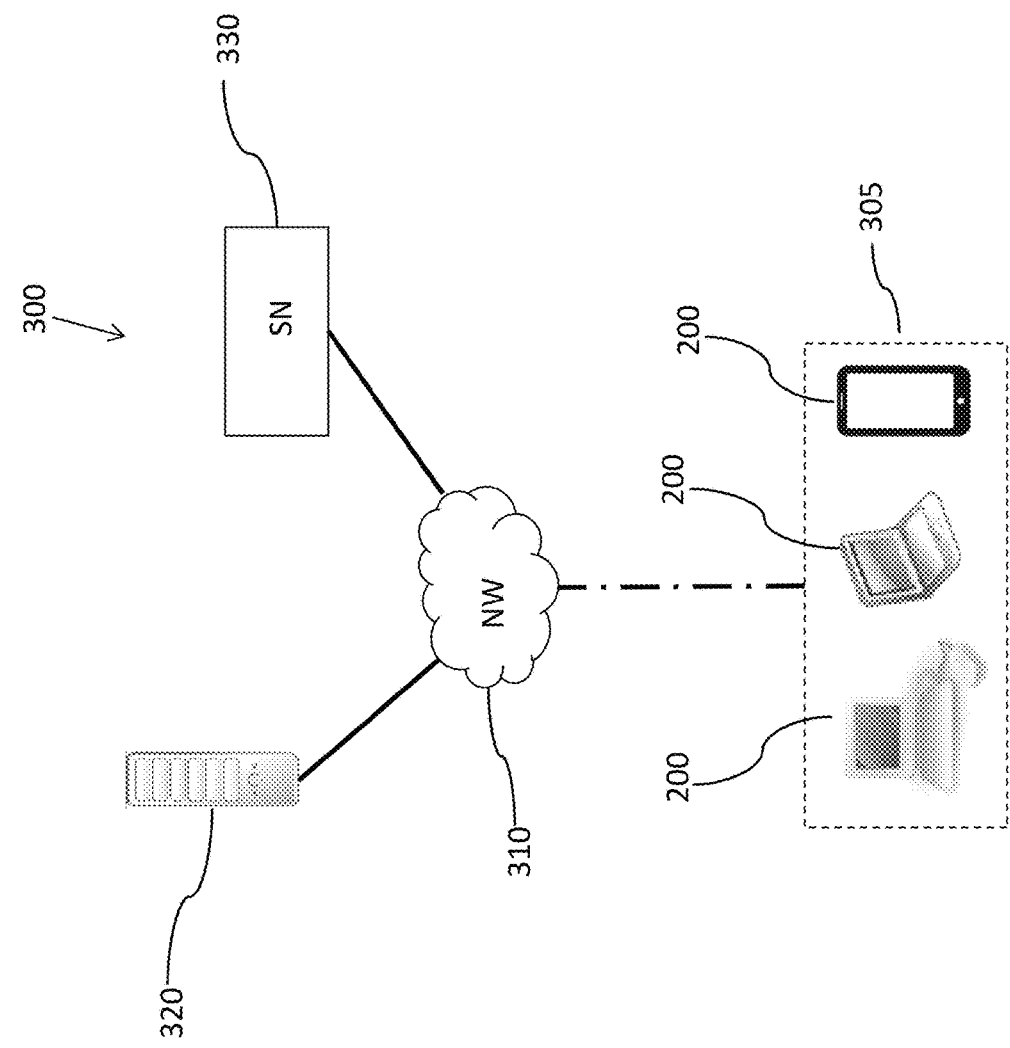
FIG. 3 shows an example system in which some embodiments may be provided.

FIG. 3 schematically shows a system 300 in some embodiments. The system 300 comprises a server 320 which may store databases of game players' details, profiles, high scores and so on. In practice, one or more databases may be provided. Where more than one server is provided, the database(s) may be provided in one database or across two or more servers. The server may also have a games data function. This may comprise a memory to store the computer game program and a processor to run the games program.

The server may communicate via for instance the Internet 310 to one or more user devices 305 and may further provide connections to a social network 330 such as Facebook™.

It should be appreciated that embodiments may be deployed in different system architectures. For example, the computer game may be implemented as a computer game that is stored in the memory 220 of the user device 200 and is run on the processor 215 of the user device 200. However, the server 320 may handle some elements of the game in some embodiments. By way of example only, a Java game applet may be provided to the user device 200 and the locally running Java applet will generate, for example, the graphics, sounds, and user interaction for the game play on the user device 200. Some data may be fed back to the server 320 to allow interaction with other players 305. The data which is fed back may also allow scoring and/or cross platform synchronization.

In some embodiments, the game may be implemented as a computer program that is stored in a memory of the system, for example the server 320, and which runs on a processor of the game server. Data streams or updates are supplied to the user device 200 to allow the user device 200 to render and display graphics and sounds in a browser of the user device 200. Such an approach is sometimes referred to as a web services approach. It should be appreciated, however, that such an approach does not necessarily require the use of the Internet.

Figure 4:
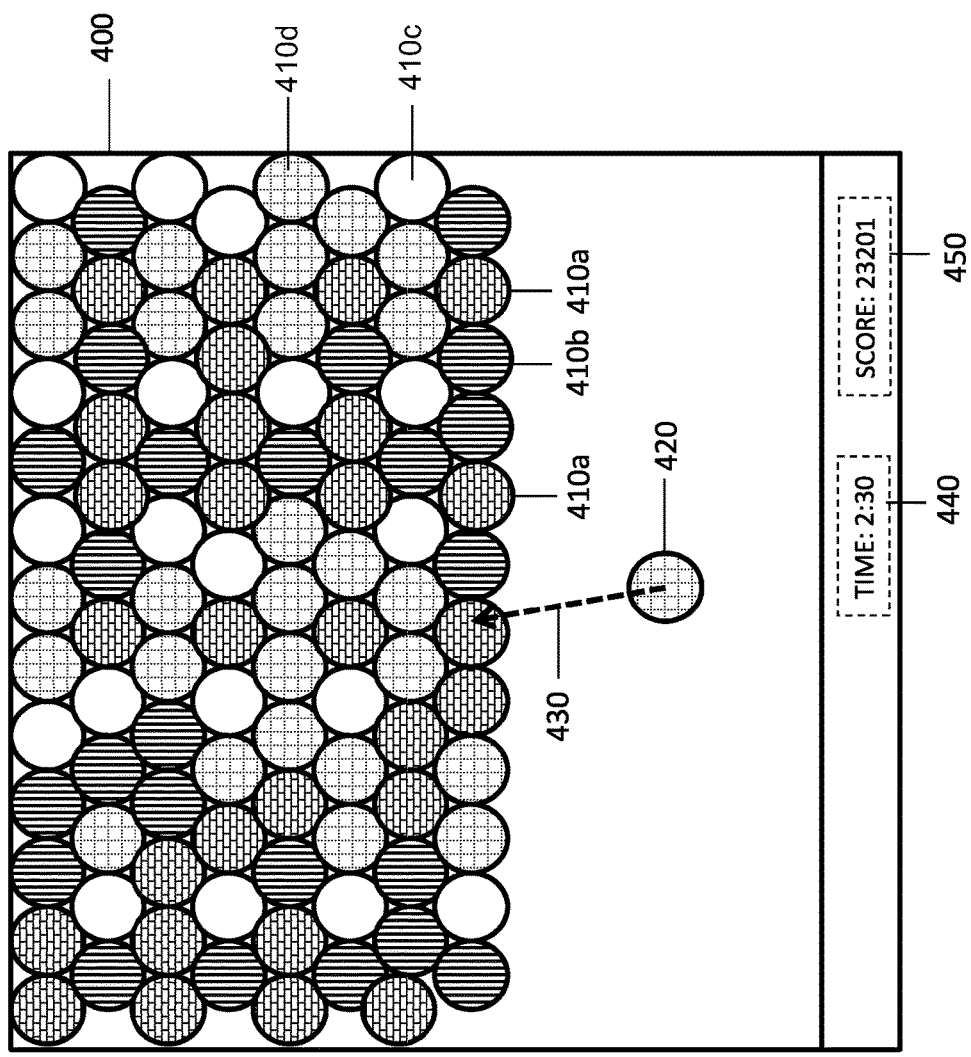
FIG. 4 illustrates schematically a game area according to some embodiments.

Embodiments will now be described with reference to FIG. 4 and FIG. 5. FIG. 4 shows a game area 400 of an embodiment comprising game objects 410a, 410b, and 410c. Also provided are a player object 420 and a targeting indicator 430 responsive to input from the player. Game data in the form of elapsed time 440 and score 450 are shown.

Figure 5:
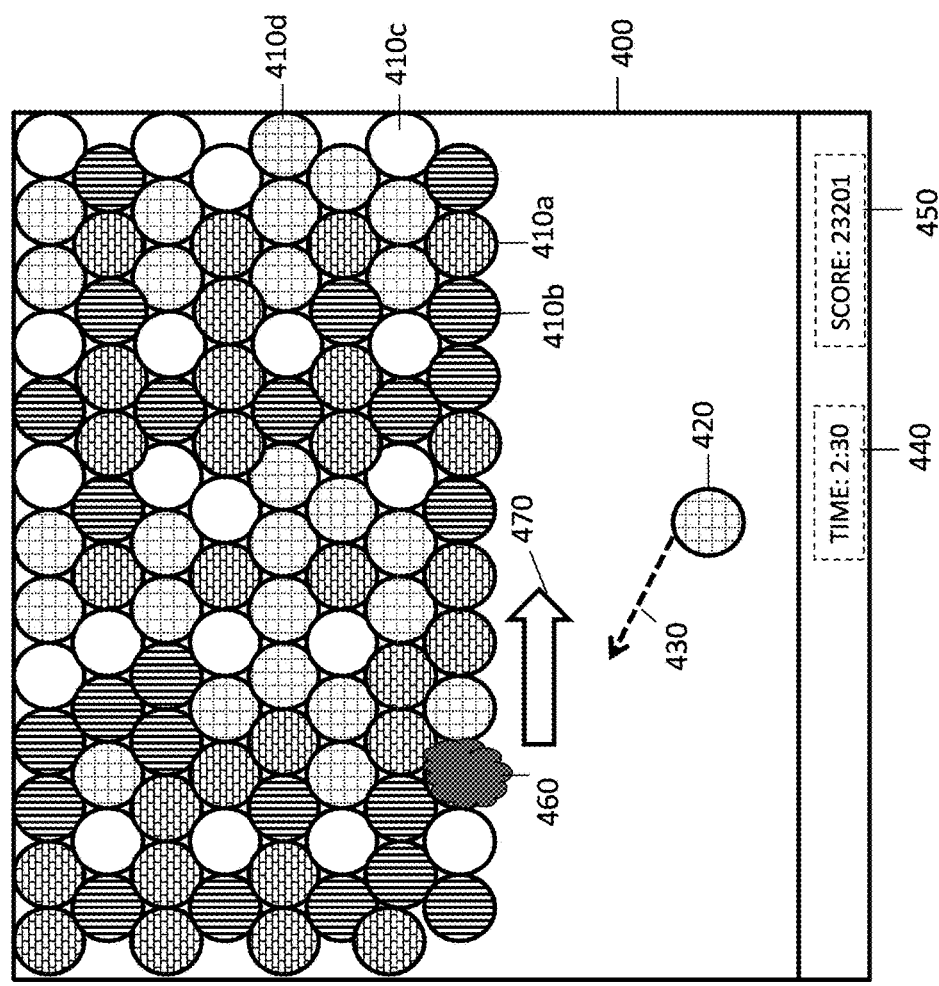
FIG. 5 illustrates a game area with a game element according to some embodiments.

FIG. 5 shows the game area 400 of FIG. 4, with the addition of a special game element 460. In this embodiment the special game element 460 is shown as a cloud. The cloud game element 460 may be stationary with respect to the game area 400, or in alternative embodiments, the cloud may move as indicated by arrow 470. The cloud game element may be generally the same size as a game object (for example a bubble). Alternatively or additionally the cloud game element may cover two or more game objects.

Thus the cloud game element may be a stationary object, covering one or more bubble game objects. For example a cloud game element may cover or obscure a colour of a bubble game object.

Alternatively, a cloud shaped game element may move or drift across the game area 400, obscuring or covering the one or more game objects making them harder to shoot, or immune to being shot by player.

When the cloud game element has been hit by a player object, a predetermined number of times the colour of the bubble game object(s) under the cloud may be revealed. The predetermined number of times may be one or more times. In some embodiments, the predetermined number of times may be one. If there is a match, the game object under the cloud may drop down.

Figure 6:
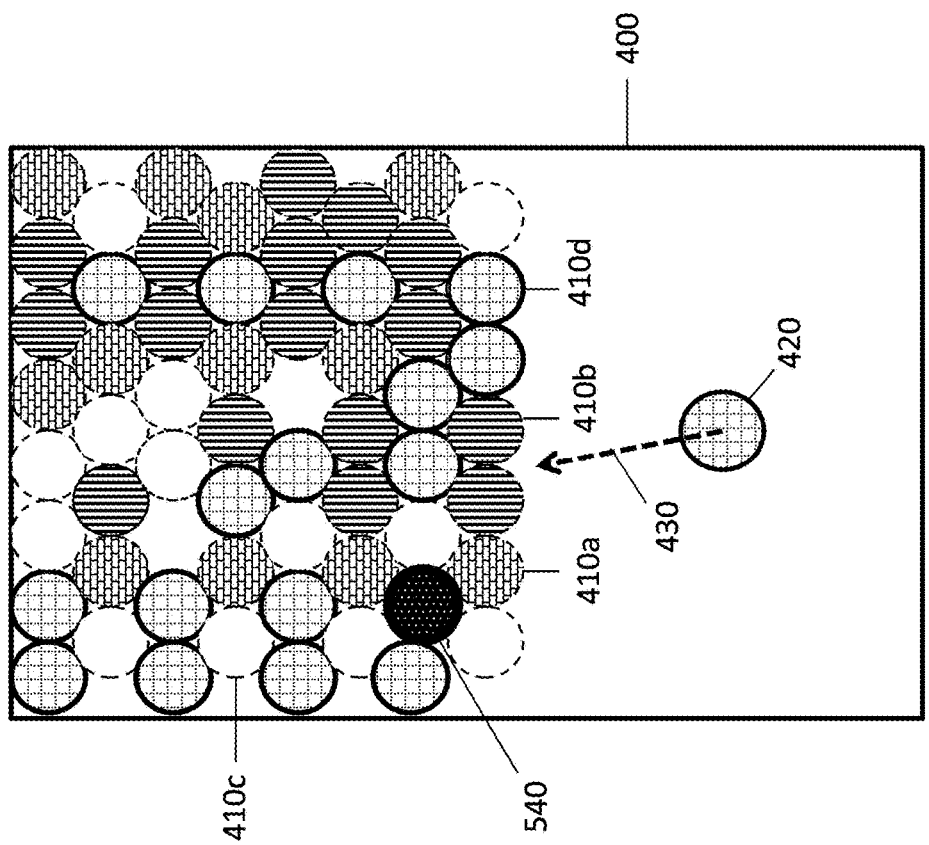
FIG. 6 illustrates a game area with a game element according to some embodiments.

In another embodiment as shown in FIG. 6, a special game element 540 is depicted as a black disc or hole. For example in an embodiment the special game element 540 of FIG. 6 may have programmed characteristics to absorb player objects fired at it. Such a game element 540 may be depicted as a "black hole.

In some embodiments, the black hole game element may be destroyed or caused to drop down by the player by eliminating game objects 410a, 410b around the game element 540. This may be in the alternative or an additional option to the absorbing of a predetermined number of game objects.

The black hole game element may be generally the same size as a game object (for example a bubble). Alternatively or additionally the black hole game element may cover two or more game objects.

In some embodiments, the black hole may absorb a predetermined number of player objects before the black hole is removed. The predetermined number of times may be one or more times. In some embodiments, the predetermined number of times may be three times.

The player object may be shot at the special game element. The player object is then removed from the display after hitting the black hole game element. The display may be controlled such that the player object appears to disappear into or to be eaten by the black hole game element.

In another embodiment as shown in FIG. 7a and FIG. 7b, a special game element 640 may be programmed to eliminate a plurality of game objects 410a, 410b when a trigger event is detected by said processor 215 or server 320. FIG. 7a illustrates the game element 640 before the trigger event, and FIG. 7b illustrates a possible embodiment in which the player object 420 has collided with the special game element 640, thereby triggering the elimination of game objects 410a, 410b in a horizontal 660 direction with respect to said game area 400. The game element 640 may be a line removing booster. Alternatively or additionally the directions may be perpendicular to the horizontal direction.

Figure 8A:
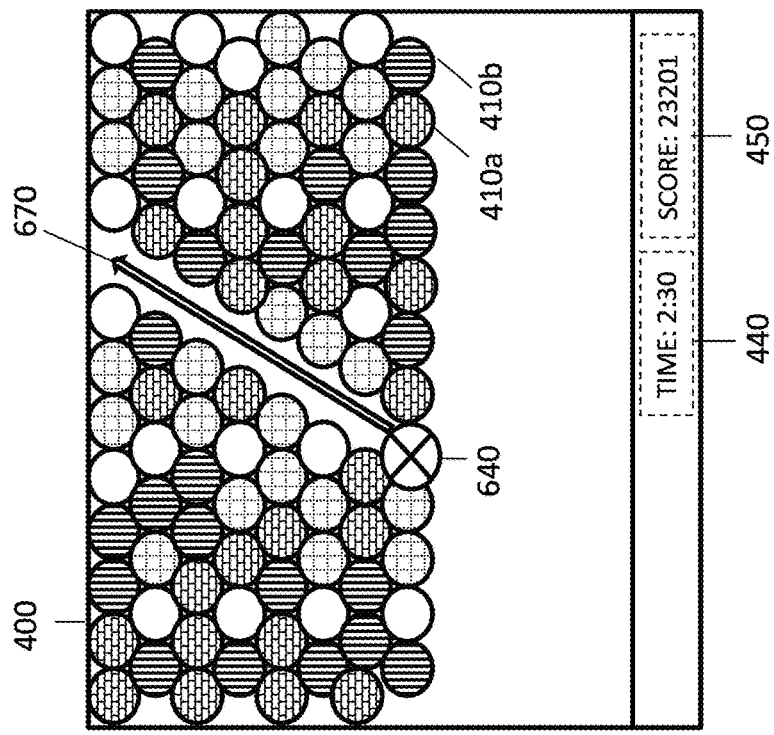
FIG. 8*a* illustrates a game area with a game element before detection of a trigger event according to some embodiments.
Figure 8B:
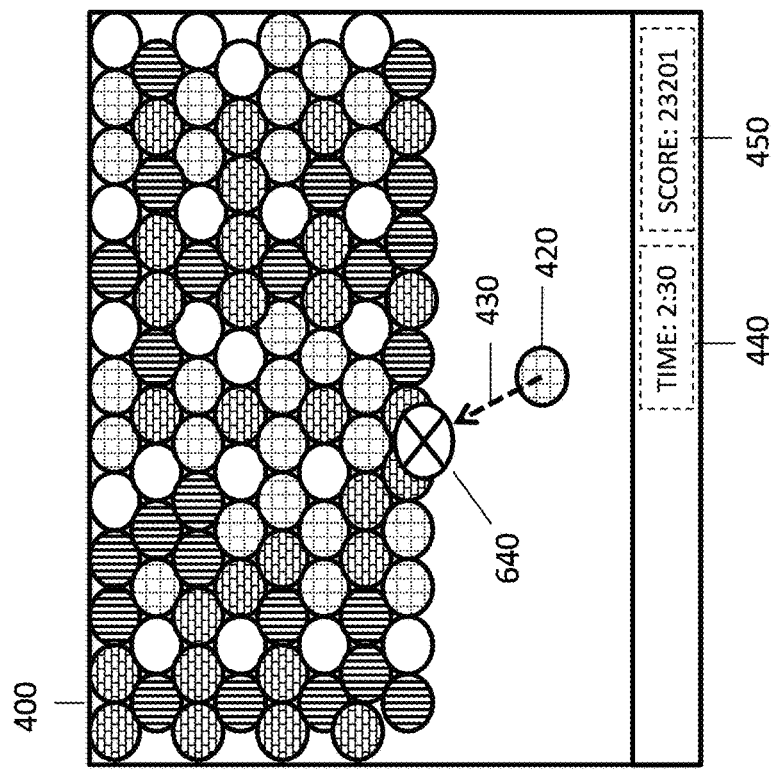
FIG. 8*b* illustrates a game area with a game element after detection of a trigger event according to some embodiments.

In another embodiment as shown in FIG. 8a and FIG. 8b, a special game element 640 may be programmed to eliminate a plurality of game objects 410a, 410b when a trigger event is detected by said processor 215 or server 320. FIG. 8a illustrates the game element 640 before the trigger event, and FIG. 8b illustrates a possible embodiment in which the player object 420 has collided with the game element 640, thereby triggering the elimination of game objects 410a, 410b in a diagonal 670 direction with respect to said game area 400.

In some embodiments, the line removing game element may be added to the game play area when the user selects a line removing booster. Alternatively or additionally the line removing game element may be provided to the game play area at the beginning of a level.

In some embodiments, the line removing game play element may appear like the other game elements and its function is only revealed when hit by a player element. In some embodiments, if this line game element drops down, the line game element is activated.

In some embodiments, the direction of the line of game elements which is removed may be selected at random. In other embodiments, a predetermined line direction, e.g. always horizontal, always diagonal etc. is provided. In other embodiments, the line direction removed may be dependent on the direction of impact of the player element.

In some embodiments, the player element needs to directly impact the line removing element in order for a line of game elements to be removed. In some embodiments, indirect impacts may cause the line removing element to be activated. In some embodiments, if this line game element drops down, the line game element is activated.

In some embodiments, a plurality of different line removing elements with different properties may be provided in the game.

Alternatively or additionally the line removing booster may be a special player element being fired at the game elements.

The game elements may be characterised by predetermined data which describes their behaviour and effect on screen.

Different game elements may have different characteristics.

The characteristics may comprise trigger events defining the game element behaviour.

In another embodiment a booster may be programmed to have "undo last move" characteristics, wherein, upon triggering event detection, the processor 215, 320 resets said displayed game area and said game objects to a previous state. The booster is an option which may be selected by a user. In some embodiments, available and/or potentially available boosters may be displayed on the display and which may be selected by the user via the user interface.

In an embodiment, the previous state comprises the game state immediately prior to the triggering event, hence providing an "undo last move" game element. In some embodiments, the previous state may be n game states prior to the current game state, where n is an integer. A previous game state may be defined as the game state prior to the previous firing of a player object.

The booster can be earned by attaining levels of performance in the game and/or by purchasing a booster with real money and/or in game currency.

Alternatively, the undo function may be provided by a special game element which when activated provides an undo function.

The undo function may not be available after certain events. Those events may be the use of other boosters. By way of example the other booster may change a colour of a game element or be a destructive booster.

If the undo option is selected while game or player objects elements are still moving, the undo function will wait until the game or player objects are no longer moving.

Figure 9:
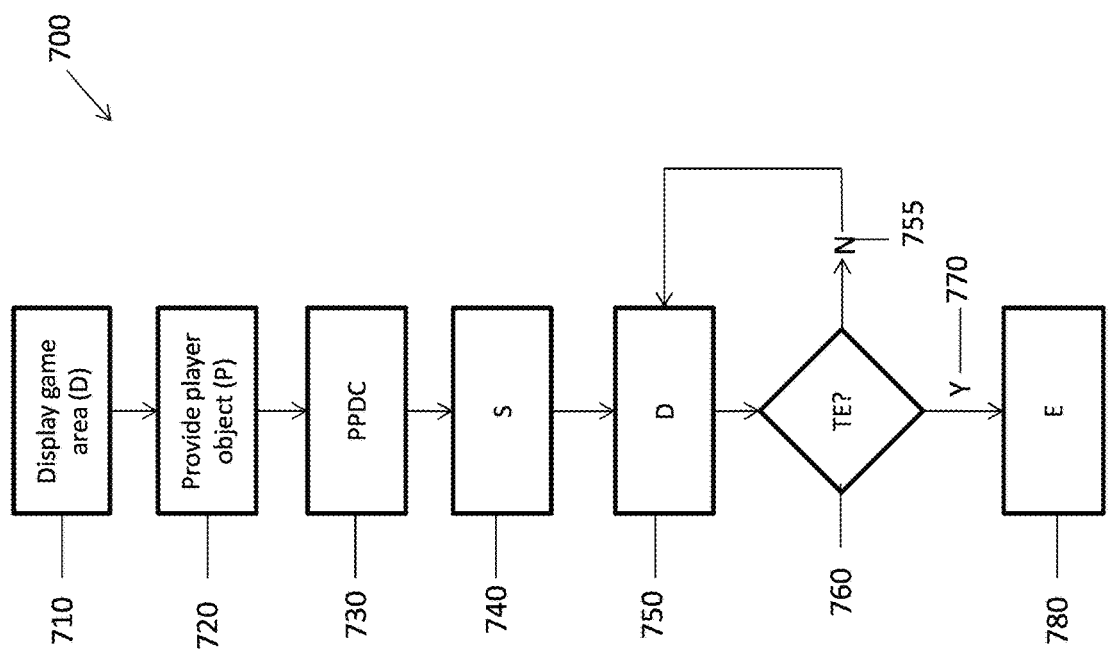
FIG. 9 is a flowchart illustrating steps in a method of an embodiment.
Figure 10:
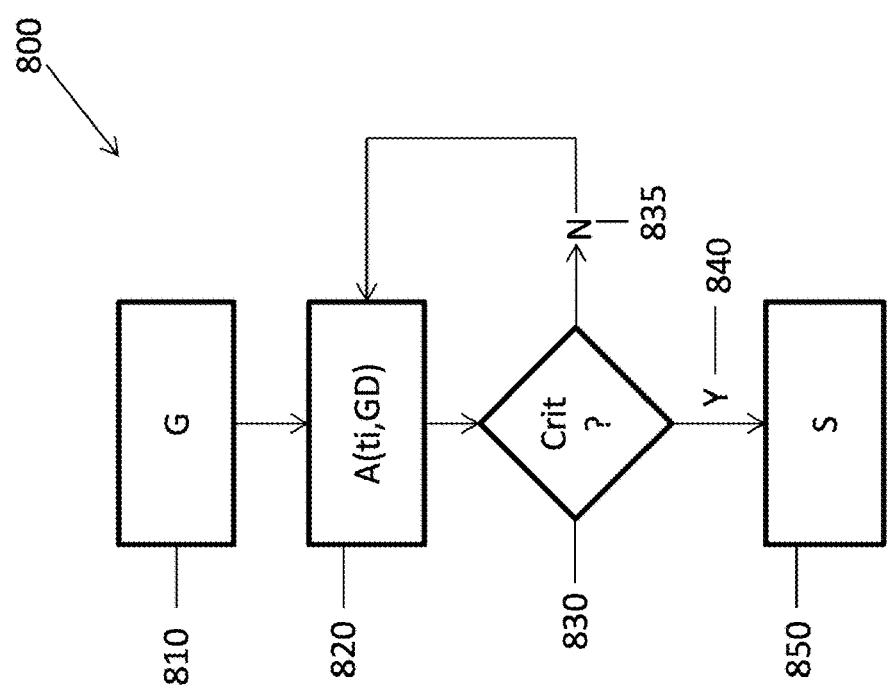
FIG. 10 is a flowchart showing in more detail an embodiment of an algorithm.

FIGS. 9, 10 and 11 will now be described, in order to help illustrate embodiments showing how game elements may be technically characterised, stored, generated and selected during a game using example methods.

FIG. 9 illustrates steps of an example method. The method is suitable for providing a game element within a game adapted to be played on data processing apparatus having a display, such as, but not limited to the user device 200 and/or system 300 which may include server 320. In a first step 710 the processor 215 displays (D) a game area 400 having a plurality of game objects 410a, 410b on a display 255.

In a next step 720 there is also provided (P), for display a player object 420 configured for targeting and shooting of the game objects 410a, 410b in response to player input via, for example the input device 265, which may be one or more of a touchscreen, keyboard, mouse, joystick, gamepad and other suitable input device.

In a next step 730 predetermined data (PPDC) comprising characteristics of at least one game element and/or a booster is provided. This may be in the form of a table 900 as shown in FIG. 11. The data may comprise characteristics 920 of respective game elements and boosters 910, together with trigger event data 930. The data may be stored in memory 220 and/or memory of the server 315 and provided to the processor 215 of the user device 200 and/or the server 315.

In some embodiments one or more of the game elements and boosters may be omitted.

In alternative embodiments, boosters may be provided in one table and special game elements in another table.

In a next step 740 the processor selects (S) at least one game element and/or booster and associated characteristics for display, and subsequently in a following step 750 displays the game element and/or booster.

The processor then monitors at step 760 for a trigger event (TE). The trigger event or events 930 may be provided in the predetermined data 900.

If a trigger event is detected, then the processor moves 770 to step 780 and executes the characteristics of the displayed game element.

For example the cloud game element may reveal the bubble below by the trigger event of a player element striking the cloud game element.

For example, the game element 540 as previously described may be depicted as a "black hole" and may only be destroyed by the trigger event of striking of a predetermined number of player objects on the black hole game element and/or eliminating game objects 410a, 410b around the game element 540.

In another embodiment, the trigger event may be the detection of a collision of the player object with the game element 640, with the game elements 640 then eliminating a plurality of game objects 410a, 410b in a horizontal 660 direction (FIG. 7b) or a diagonal 670 direction (FIG. 8b) with respect to said game area 400.

For example the trigger event of the undo booster is the selecting of that booster causing the previous turn to be undone.

FIG. 10 illustrates the steps of an example selection method for selecting and generating a game element or booster. At step 810 the processor selection comprises selecting a game element for generation (G) determined by an algorithm (A (ti, GD) step 820 or the selection of an available or potentially available booster. The algorithm may determine generation and selection based on criteria as shown at step 830.

In an embodiment the criteria may be based on game data (GD).

In another embodiment the criteria may be monitoring a time interval (ti) since a game element was last generated.

In another embodiment both game data and time may be monitored to set the criteria for the algorithm. For example, a game element may only be selected if a certain score is reached in a certain time.

Other embodiments may comprise the aggregation of two or more scores, time and level data.

Other embodiments may comprise randomly selecting based on for instance a random number function.

If the criteria at step 830 is met then the processor moves via flow 840 (Y) to step 850 and the game element and/or booster is selected for display along with its associated data 920, 930, shown for example in FIG. 11 and as previously described.

One or more of the special game elements may be removed by other special game elements which have a destruction function such as bomb function or a fireball function.

An undo booster can be awarded to the player or seeded in any number of ways. The player can also purchase the boosters before or during the game using soft currency collected in the game or hard currency bought for real money. It is however understood that the payment options implemented in the game can vary.

Some embodiments therefore provide a framework or architecture which enables new game elements then to be incorporated in a game in modular, upgradeable fashion. This may increase the user's engagement over time. The game elements may be provided via download or in real-time from a server, to update the game on the user device.

Different Devices

Some embodiments of the game allows for the game to be synchronised between different devices or platforms.

The game can for instance be played in an offline mode on a handheld device using locally stored information on the handheld device. The device can store all or some of the levels that are available for the player to play in the game. Some of the features in the game can be locally run on the device and dependent on the local machine. This can for instance be that if the game is implemented to regenerate lives after a certain period of time, then the time can be locally decided based on the clock on the device. In some embodiments, the central game server clock can override the local clock when the local device has been synchronised with the server.

A game can be implemented so that the player knows if it has synchronised the available data with the central server or servers. This can for instance be through a coloured symbol or a check mark that indicates that the information is up to date.

The game can also indicate if it has been able to establish a connection with the central server for synchronisation or if for instance the network connection is down. That the device is offline can for instance be illustrated with a greyed out icon.

Different Platforms (FB/Google+)

The game can be implemented to synchronize game state information and/or retrieve and connect to the social graph information and user profile of the player on a social network such as Facebook or Google+.

The game can also be implemented so that it is connected to a plurality of social networks. The user can be given the option to select what information that can be derived and shared with which social network.

One example of how the game can be connected to a social network is the Facebook™'s Open Graph API allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post event such as that a player has purchased objects in the game or received objects from other players of the game.

Various methods have been described. It should be appreciated that these methods will be implemented in apparatus, where the apparatus is implemented by any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor.

It is also noted herein that while the above describes exemplifying embodiments of the invention, there are several variations and modifications which may be made to the disclosed solution without departing from the scope of the present invention.

The invention claimed is:

1. A computer implemented method of controlling a user interface responsive to user engagement with displayed game elements on the interface, the method comprising the following implemented by a processor of a computer device
displaying a game area for a game having a plurality of game objects of different types on said interface,
providing a launcher configured to provide a sequence of player objects of different types into the game area;
the launcher receiving player input for targeting and shooting of said game objects by said player objects provided by the launcher,
detecting if a player object hits a game object of the same type as the player object, the hit game object being adjacent to another of the game objects of the same type as the hit game object,
and, if so, removing from the game area the player object, the hit game object and any adjacent another game objects,
providing data comprising characteristics of at least one game element,
selecting said at least one game element and associated characteristics for display,
displaying in the game area said at least one game element,
detecting if a player object hits the at least one game element,
when it is detected that the player object hits the at least one game element executing said characteristics of said at least one game element in said game based on the data, said characteristics of said at least one game element comprising absorbing the player object which has hit the at least one game element, and controlling the user interface to depict the player object disappearing into the at least one game element.

2. A method as claimed in claim 1, wherein said at least one game element absorbing game or player objects is removed after said at least one game element has absorbed a predetermined number of game or player objects.

3. A computer device having:
a user interface configured to display a game area for a game having a plurality of game objects of different types and to display at least one game element, said user interface being configured to receive user input; and
at least one processor in conjunction with at least one memory configured to:
provide a launcher configured to provide a sequence of player objects of different types into the game area,
the launcher receiving player input for targeting and shooting of said game objects by said player objects provided by the launcher,
detect if a player object hits a game object of the same type as the player object, the hit game object being adjacent to another of the game objects of the same type as the hit game object,
and, if so, remove from the game area the player object, the hit game object and any adjacent another game objects,
provide data comprising characteristics of at least one game element,
select said at least one game element and associated characteristics for display by said user interface, wherein the at least one game element is depicted in the game area, and
detect if a player object hits the at least one game element, and
when it is detected that the player object hits the at least one game element
execute said characteristics of said at least one game element in said game based on the data, said characteristics of said at least one game element comprising absorbing at least one player object which has hit the at least one game element, and controlling the user interface to depict the player object disappearing into the at least one game element.

4. A computer implemented method of controlling a user interface responsive to user engagement with displayed game elements on the interface, the method comprising the following implemented by a processor of a computer device
displaying a game area for a game having a plurality of game objects of different types on said interface,
providing a launcher configured to provide a sequence of player objects of different types into the game area;

the launcher receiving player input for targeting and shooting of said game objects by said player objects provided by the launcher, detecting if a player object hits a game object of the same type as the player object, the hit game object being adjacent to another of the game objects of the same type as the hit game object, and, if so, removing from the game area the player object, the hit game object and any adjacent another game objects, providing data comprising characteristics of at least one game element, selecting said at least one game element and associated characteristics for display, displaying said at least one game element, and executing said characteristics of said at least one game element in said game based on the data, said characteristics of said at least one game element comprises absorbing at least one game or player objects wherein said at least one game element absorbing at least one game or player objects is removed after said at least one game element has absorbed a predetermined number of game or player objects.

5. A computer device having:

a user interface configured to display a game area for a game having a plurality of game objects of different types and to display at least one game element, said user interface being configured to receive user input; and at least one processor in conjunction with at least one memory configured to:

provide a launcher configured to provide a sequence of player objects of different types into the game area, the launcher receiving player input for targeting and shooting of said game objects by said player objects provided by the launcher, detect if a player object hits a game object of the same type as the player object, the hit game object being adjacent to another of the game objects of the same type as the hit game object, and, if so, remove from the game area the player object, the hit game object and the any adjacent another game objects, provide data comprising characteristics of at least one game element, select said at least one game element and associated characteristics for display by said user interface, and executing said characteristics of said at least one game element in said game based on the data, said characteristics of said at least one game element comprise absorbing at least one game or player objects wherein said at least one game element absorbing at least one game or player objects is removed after said at least one game element has absorbed a predetermined number of game or player objects.

* * * * *